Patented July 2, 1935

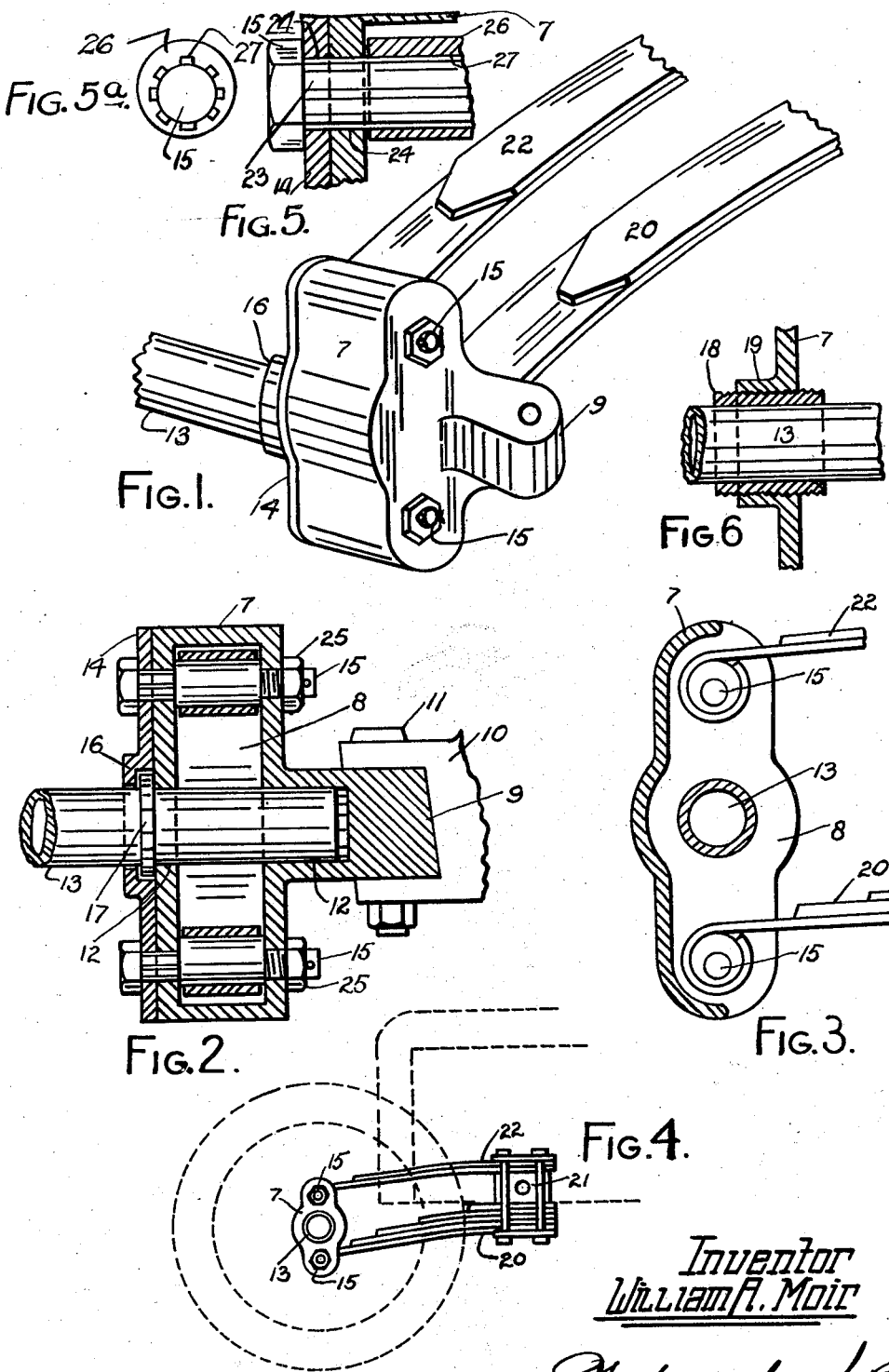

2,006,508

UNITED STATES PATENT OFFICE 2,006,508

SPRING SUSPENSION FOR VEHICLES

William Alexander Moir, Sydney, New South Wales, Australia

Application July 14, 1933, Serial No. 680,361 In Australia November 8, 1932

1 Claim. (Cl. 267—41)

This invention relates to spring suspension for vehicles, and has been specially devised to provide comparatively cheap and simple means whereby each of the front road wheels is allowed independent spring action with consequent compensating movement to the front axle, thereby considerably minimizing road shocks and bumps, affording increased riding comfort, and obviating the likelihood of spring breakage and other wear and tear. This invention may be applied to existing motor vehicles as well as be incorporated in the design of new vehicles.

According to this invention a bracket member or the like is rotatably or part rotatably mounted upon each end of the front axle of the motor vehicle, and to each said bracket member one of the stub axles of the front road wheel is suitably connected. Each of the brackets has provision for the reception of one end of the supporting side springs (which are not connected direct to the axle as usual) and also for the reception of one end of a torque member. The anchorage points of the supporting spring and the torque member on the bracket members are on opposite sides of the axle which is preferably of tubular form. The other ends of the torque members and supporting springs are affixed to the vehicle's chassis in any suitable way.

The torque member and the spring, say of quarter elliptic form are preferably arranged in pairs at each side of the vehicle and positioned one above the other, the torque member being uppermost.

In some constructions the springs and torque members are connected to their respective brackets by pins, bolts, eccentric blocks or other suitable means, to allow of adjustment of the angular setting of the fore ends of said springs and torque members relatively to said brackets in order that the steering mechanism can properly function at all times.

In order more fully to describe this invention, reference will be had to the drawing accompanying and forming part of this specification, which drawing is more or less schematic and wherein:—

Fig. 1 is a perspective view of a bracket member and the parts attached thereto, Fig. 2 is a longitudinal sectional elevation through a bracket member, Fig. 3 is a transverse sectional elevation thereof, Fig. 4 shows in side elevation the application of the invention to one side of the front of a motor vehicle, Fig. 5 shows a cross sectional elevation of a splined pin bolt and eccentric block, Fig. 5a shows an end elevation of the structure of Fig. 5, and Fig. 6 shows in sectional elevation alternative means for attaching the axle to the bracket member.

The bracket members 7, of which there are two, are preferably of steel and may conveniently be stampings or die castings, and are each of hollow form with an open portion 8 and a side lug 9 (for affixture of a stub axle 10 by a king pin 11), and there are axial orifices 12 which form bearings for the reception of the ends of the axle 13.

A retaining plate 14 is affixed to the inner face of each bracket 7 by pin bolts 15, which may be of ordinary or any other desired construction, passing through orifices in the said bracket member 7 and the plate 14, which latter has a retaining flange 16 thereon.

The axle 13 preferably of tubular form has the bracket members 7 rotatably freely fitted on its ends as clearly shown in Fig. 2, and there are collars 17 shrunk on or otherwise arranged near the axle ends and adapted to fit under the retaining flanges 16 of the respective bracket members 7 and so prevent the axle 13 from pulling away from said members 7.

In alternative means for connecting the axle 13 rotatably to the bracket members 7 (see Fig. 6) the retaining plate 14 is dispensed with and a screwed sleeve 18 is shrunk on or otherwise affixed to the said axle 13 in place of each of the collars 17, and screws into a screwed boss 19 provided on the inner wall of the bracket members 7.

The supporting springs 20 are of any suitable type, say quarter elliptic form, are arranged at each side of the front end of the vehicles, and have their eyes or loops connected to the lower pin bolts 15 of the respective bracket members 7. The other end of the springs 20 are clamped or otherwise affixed, say by a clamping bracket 21 of any usual construction, to the vehicle chassis or other suitable point.

Above each spring 20 a torque member 22 is arranged, which is preferably of spring type having two or more leaves and has a loop or eye at the outer fore end connected to the upper pin bolt 15, while its other end is affixed to the vehicle chassis or to the spring clamping bracket 21 at the top portion thereof.

In some constructions of the invention, when it is desired to provide adjustment means at the connecting points of the springs 20 and torque members 22 with the brackets 7, the pins 15 may have splined stems 23 (see Fig. 5) passing through complementarily slotted orifices 24 in the said members 7 and retaining plate 14 (if one is used). The outer screwed ends of these pin bolts 15 are adapted to pass through plain orifices in the brackets 7 and have nuts 25 fitted on the ends thereof. Upon the splined stem 23 of these pin bolts 15, eccentric blocks 26 are adapted to be fitted by their complementarily slotted bore 27, and the spring and torque member eyes or loops are engaged around or over the said eccentric blocks 26.

The angular setting of the springs 20 and the torque members 22 is effected by adjusting the eccentric blocks 26 around their pin bolts 15, the splines 23 of which prevent movement during operation.

It is to be understood that the above mentioned adjusting devices may be varied in many ways by suitable well known mechanical means and the invention is not limited to this precise form, except as claimed.

I claim:—

In a motor road vehicle, a front axle, a bracket member rotatably mounted on each end of said axle, means on each of said brackets in line with each end of the axle for receiving the connection of a stub shaft carrying a vehicle wheel, a suspension spring associated with each bracket and having one end thereof fixed to the chassis of the vehicle and the other end thereof adjustably connected to a part of said bracket extending below said axle, a torque spring associated with each bracket and having one end thereof fixed to the chassis of the vehicle and the other end thereof adjustably connected to a part of said bracket extending above said axle, and means for retaining each of said brackets on the ends of said axle.

WILLIAM ALEXANDER MOIR.